Nov. 18, 1930.　　　D. BARTOLETTI　　　1,782,283

ANTISKID CHAIN FOR AUTOMOBILES

Filed April 21, 1928

Dante Bartoletti,
INVENTOR

BY Victor J. Evans
ATTORNEY

Patented Nov. 18, 1930

1,782,283

UNITED STATES PATENT OFFICE

DANTE BARTOLETTI, OF PITTSBURGH, PENNSYLVANIA, ASSIGNOR OF ONE-HALF TO MARINO FREDICI, OF MONESSEN, PENNSYLVANIA

ANTISKID CHAIN FOR AUTOMOBILES

Application filed April 21, 1928. Serial No. 271,886.

This invention relates to anti-skid chains for motor vehicles and the like, the general object of the invention being to form the cross chains in pairs, with the central links of each pair connected together, with the chains of each pair having their ends diverging from the center.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
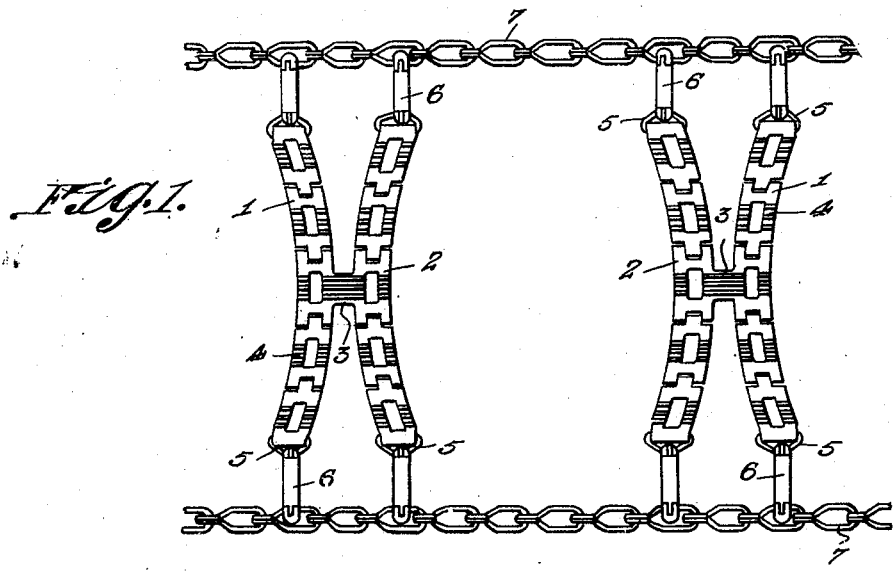
Figure 1 is a fragmentary view of the improved device, showing two pairs of cross chains.
Figure 2:
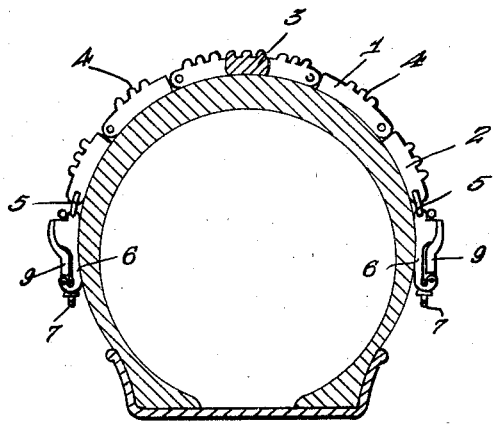
Figure 2 is a transverse sectional view through a tire, showing the invention in use.

As shown in these views, the cross chains 1 are arranged in pairs, with the central links 2 of each pair connected together by a cross piece 3 which is preferably formed integral with both central links. The links of each cross chain are made in the form of a block with an opening in its center and with a tongue at one end and a recess at its other end, the recess receiving the tongue of an adjacent link. The outer faces of the links are roughened or grooved, as shown at 4, and the grooves of the central links extend through the cross piece 3. Each cross chain is also of curved shape so that the pair of chains have their ends diverging from the center, as clearly shown in Figure 1.

Figure 3:
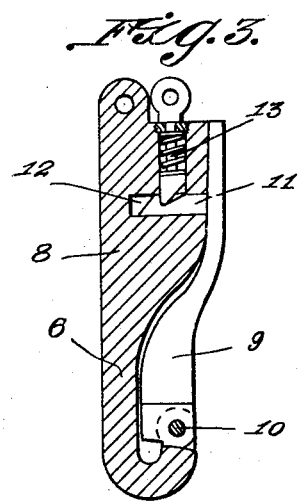
Figure 3 is a sectional view through the hook for connecting each cross chain with each side chain.

A loop 5 of wire or the like is attached to each end link of each cross chain and a hook 6 has one end attached to this loop and its other end is adapted to detachably engage a side chain 7. I prefer to form each hook 6 as shown in detail in Figure 3, wherein the body of the hook is shown at 8, with a member 9 pivoted to the horn of the hook, as shown at 10, said member 9 having a keeper member 11 thereon which is adapted to engage a recess 12 formed in the body and the body also carries a spring plunger 13 for engaging a notch in the keeper member to hold the member 9 in closed position. Thus by freeing the keeper member by pulling out the plunger, the member 9 can be swung outwardly and passed over a link of a side chain so that said link will engage the horn of the hook and then the member 9 is closed and locked by the plunger. This arrangement permits the cross chains to be removed and replaced by new ones when they become worn. By making the cross chains as specified, they will firmly grip the road surface and prevent slipping and skidding of the wheel to which they are attached and by making them of curved formation, portions of each cross chain will remain in contact with the road surface much longer than if the chains were made straight.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

A cross unit for an anti-skid chain comprising a pair of arcuate members each consisting of a series of arcuate links, and an integral connection extending between the middle links of each series, the said members having their convex sides opposed.

In testimony whereof I affix my signature.

DANTE BARTOLETTI.